United States Patent
Yada et al.

(10) Patent No.: US 12,021,427 B2
(45) Date of Patent: Jun. 25, 2024

(54) MOTOR, VEHICLE POWER UNIT WITH MOTOR, GENERATOR, VEHICLE WHEEL BEARING WITH GENERATOR

(71) Applicant: NTN CORPORATION, Osaka (JP)

(72) Inventors: Yuuji Yada, Iwata (JP); Kentaro Nishikawa, Iwata (JP); Mitsuo Kawamura, Iwata (JP)

(73) Assignee: NTN CORPORATION, Osaka (JP)

( * ) Notice: Subject to any disclaimer, the term of this patent is extended or adjusted under 35 U.S.C. 154(b) by 877 days.

(21) Appl. No.: 16/953,218

(22) Filed: Nov. 19, 2020

(65) Prior Publication Data

US 2021/0075289 A1 Mar. 11, 2021

Related U.S. Application Data

(63) Continuation of application No. PCT/JP2019/019968, filed on May 20, 2019.

(30) Foreign Application Priority Data

May 22, 2018 (JP) ................................. 2018-097559

(51) Int. Cl.
*H02K 3/52* (2006.01)
*B60B 27/00* (2006.01)
(Continued)

(52) U.S. Cl.
CPC ......... *H02K 3/522* (2013.01); *B60B 27/0015* (2013.01); *B60B 27/0052* (2013.01);
(Continued)

(58) Field of Classification Search
CPC ........ H02K 3/522; H02K 7/006; H02K 7/102; B60T 1/065; B60B 27/0015; B60B 27/0052; B60K 7/0007; B60K 2007/0092
See application file for complete search history.

(56) References Cited

U.S. PATENT DOCUMENTS 7,059,437 B2 6/2006 Heinen
7,530,415 B2 5/2009 Heinen
(Continued)

FOREIGN PATENT DOCUMENTS

CN 102951010 A 3/2013
EP 1 252 034 B1 11/2004
(Continued)

OTHER PUBLICATIONS

International Preliminary Report on Patentability dated Dec. 3, 2020 with Written Opinion of the International Searching Authority issued in International Patent Application No. PCT/JP2019/019968.
(Continued)

*Primary Examiner* — John D Walters

(57) ABSTRACT

Provided is a motor which includes a stator that can be received in a limited housing space and is capable of providing an increased output without increasing an axial length of the stator; a vehicle power unit including the motor; a generator; as well as a vehicle wheel bearing assembly with the generator. The motor generator includes: a stator including a stator core having an annular shape and stator coils wound around the stator core; and a rotor located opposite to the stator in a radial direction. Each of the stator coils includes coil ends that protrude with respect to an axial width of the stator core in an axial direction. A bus bar is connected to a wiring connection part at the coil ends, and the bus bar is disposed within an axial width of the stator core.

5 Claims, 12 Drawing Sheets

(51) Int. Cl.
   *B60K 7/00*    (2006.01)
   *H02K 7/00*    (2006.01)
   *H02K 7/102*   (2006.01)
   *B60T 1/06*    (2006.01)

(52) U.S. Cl.
   CPC .......... *B60K 7/0007* (2013.01); *H02K 7/006* (2013.01); *H02K 7/102* (2013.01); *B60K 2007/0092* (2013.01); *B60T 1/065* (2013.01); *H02K 2203/09* (2013.01)

(56) References Cited

U.S. PATENT DOCUMENTS

| | | | |
|---|---|---|---|
| 7,533,747 | B2 | 5/2009 | Heinen |
| 7,717,203 | B2 * | 5/2010 | Yoshino ............... B60K 17/046 903/910 |
| 7,878,713 | B2 | 2/2011 | Ozaki et al. |
| 8,952,583 | B2 | 2/2015 | Fujii et al. |
| 9,233,603 | B2 | 1/2016 | Heinen |
| 9,387,758 | B2 | 7/2016 | Heinen et al. |
| 9,393,859 | B2 | 7/2016 | Heinen |
| 10,256,694 | B2 | 4/2019 | Fukunaga et al. |
| 10,752,104 | B2 | 8/2020 | Kawamura et al. |
| 2003/0146029 | A1 | 8/2003 | Heinen |
| 2004/0084235 | A1 | 5/2004 | Heinen |
| 2005/0029026 | A1 | 2/2005 | Heinen |
| 2006/0016628 | A1 | 1/2006 | Heinen |
| 2009/0129712 | A1 | 5/2009 | Ozaki et al. |
| 2011/0000724 | A1 | 1/2011 | Heinen |
| 2012/0013210 | A1 | 1/2012 | Fujii et al. |
| 2013/0270934 | A1 | 10/2013 | Smith et al. |
| 2014/0103700 | A1 | 4/2014 | Heinen |
| 2014/0159468 | A1 | 6/2014 | Heinen et al. |
| 2015/0357878 | A1 | 12/2015 | Fukunaga et al. |
| 2017/0110933 | A1 * | 4/2017 | Michel ............... H02K 5/203 |
| 2019/0190344 | A1 | 4/2019 | Fukunaga et al. |
| 2019/0248225 | A1 | 8/2019 | Kawamura et al. |

FOREIGN PATENT DOCUMENTS

| | | | | |
|---|---|---|---|---|
| EP | 3 153 341 | A1 | 4/2017 | |
| JP | 2007-071280 | A | 3/2007 | |
| JP | 2008-271644 | A | 11/2008 | |
| JP | 2008271644 | A * | 11/2008 | ............ F16C 41/004 |
| JP | 2010-226832 | A | 10/2010 | |
| JP | 2012-055035 | A | 3/2012 | |
| JP | 2012055035 | A * | 3/2012 | |
| JP | 2014-138499 | A | 7/2014 | |
| JP | 2017-200268 | A | 11/2017 | |
| JP | 2017-204960 | A | 11/2017 | |
| JP | 2017200268 | A * | 11/2017 | |
| JP | 2018-052482 | A | 4/2018 | |
| JP | 2018052482 | A * | 4/2018 | ......... B60B 27/0047 |
| JP | 2018-197567 | A | 12/2018 | |

OTHER PUBLICATIONS

International Search Report for corresponding PCT/JP2019/019968, dated Jul. 23, 2019.

Indian Office Action dated Nov. 1, 2022 in Indian Patent Application No. 202017050900 (6 pages).

Chinese Office Action dated Nov. 23, 2022 in Chinese Patent Application No. 201980034421.7 (9 pages; 13 pages English translation).

Japanese Office Action dated Feb. 22, 2022 in Japanese Patent Application No. 2018-097559 (4 pages; 4 pages English translation).

Extended Supplementary European Search report dated Jan. 24, 2022 in European Patent Application No. 19808138.2 (9 pages).

* cited by examiner

MOTOR, VEHICLE POWER UNIT WITH MOTOR, GENERATOR, VEHICLE WHEEL BEARING WITH GENERATOR

CROSS REFERENCE TO THE RELATED APPLICATION

This application is a continuation application, under 35 U.S.C. § 111(a), of international application No. PCT/JP2019/019968, filed May 20, 2019, which is based on and claims Convention priority to Japanese patent application No. 2018-097559, filed May 22, 2018, the entire disclosure of all of which are herein incorporated by reference as a part of this application.

BACKGROUND OF THE INVENTION

Field of the Invention

The present invention relates to a motor, a vehicle power unit including the motor, a generator, and a vehicle wheel bearing assembly with the generator. The present invention also relates to a technology applied to vehicles.

Description of Related Art

As for vehicle motors that are increasing in demand in connection with electric motorization of vehicles, a lot of effort has been made to achieve simplified, space-saving and low-cost wiring connection of motor winding coils. For example, in Patent Document 1 and Patent Document 2, a bus bar is disposed at an end face of a motor stator so as to provide simplified and space-saving coil wiring connection.

However, given that an in-wheel motor unit including a motor incorporated inside a wheel or a vehicle power unit including a drive motor having a power generation function which can be received inside a wheel body to replace an existing wheel bearing without modification of constituting parts around wheels (in particular, as described by Patent Document 3 filed by the present applicant) has a small space for receiving the motor and is restricted with regard to an axial length of the motor, a structure in which a bus bar is disposed on an end face of a motor stator makes it difficult to accommodate the motor.

Related Document

Patent Document

[Patent Document 1] JP Laid-open Patent Publication No. 2010-226832
[Patent Document 2] JP Laid-open Patent Publication No. 2014-138499
[Patent Document 3] JP Laid-open Patent Publication No. 2018-052482

SUMMARY OF THE INVENTION

A vehicle power unit including a travel assist motor with a power generation function has advantages that it can be received inside a wheel body and that constituting parts around the wheels can be used without change. However, this in turn restricts the dimensions of the motor, making it difficult to increase a motor output and to effectively perform assistance of a driving force and power recovery during braking operation. In order to increase a motor output, it is necessary to increase a wheel axial length of a motor stator core so as to enlarge an area of motor magnetic poles, which, however, makes it difficult to accommodate a motor stator (including the motor stator core and coil ends) within a limited space.

There is an approach involving using a bus bar as wiring connection at coil ends of motor winding coils so as to reduce dimensions of a wiring connection part; however, the conventional approach including disposing a bus bar at an end face of coil ends cannot sufficiently shorten an overall length of a motor stator (a wheel axial length of the motor stator).

FIG. 15 is a sectional view of a conventional vehicle power unit including a drive motor having a power generation function. FIG. 16 is a perspective view of a conventional drive motor, and FIG. 17 is a vertical section view of the drive motor along a plane including a rotation axis. As shown in FIG. 15, the vehicle power unit including the drive motor having the power generation function is received within an inner periphery of a brake rotor 70. A motor stator core 74 is fixed to a knuckle 71, which is a vehicle fixing component, through a wheel bearing outer ring 72 and a motor stator fixing part 73. As shown in FIG. 16 and FIG. 17, motor winding coils 75 for flowing current so as to generate a magnetic force are wound around a motor stator core 74.

As shown in FIG. 15, a motor rotor 77 is attached to a wheel bearing flange 76, and the motor rotor 77 rotates about a motor stator (or the motor stator core; the same shall apply hereinafter) 74. The motor integrated with a wheel bearing can perform drive assistance during vehicle driving and energy recovery through power generation during braking.

Since the conventional vehicle power unit has a wiring connection part 78 of coils at an end face of coil ends 75a of the motor stator 74, the motor stator 74 has a long overall length L3 in a wheel axial direction (FIG. 17), and the vehicle power unit also has a long overall length L4 (FIG. 15) accordingly. Thus, it has been difficult to replace an existing wheel bearing with the conventional vehicle power unit without modifying a knuckle 71 which is a vehicle fixing component. In order to replace an existing wheel bearing without modifying a knuckle 71 which is a vehicle fixing component, it is necessary to reduce the overall length of the vehicle power unit, which would lead to a reduced motor output.

An object of the present invention is to provide a motor which includes a stator that can be received in a limited housing space and is capable of providing an increased output without increasing an axial length of the stator; a vehicle power unit including the motor; a generator; as well as a vehicle wheel bearing assembly with the generator.

A motor according to the present invention includes:
a stator including a stator core having an annular shape and stator coils wound around the stator core; and
a rotor located opposite to the stator in a radial direction of the motor, wherein
a bus bar is connected to the stator coils, and
the bus bar is disposed within an axial width of the stator core.

According to this configuration, the bus bar is connected to the stator coils, and the bus bar is disposed within the axial width of the stator core, so that the motor can have a smaller axial length in comparison with a conventional technology of disposing a bus bar at an end face of coil ends because the axial length of the entire stator is reduced by a length of an axially protruding part of the stator with respect to the axial width of the stator core. Even where each of the stator coils has an increased number of turns or an increased cross-sectional area with the axial length of the motor kept the same so as to increase a motor output, the motor can be received within a limited motor housing space. Where a bus bar, instead of a common insulation-coated line, is connected to the wiring connection part at the coil ends, other devices can be more easily connected or disconnected in comparison with the case where such a common insulation-coated line is used.

The motor may be of an outer rotor type in which the rotor is located radially outward of the stator, and the bus bar may be disposed radially inward of the stator core. In this case, the area in which the rotor and the stator are opposed can be increased when compared with that in an inner rotor type motor. This makes it possible to maximize an output torque within a limited space.

The motor may be of an inner rotor type in which the rotor is located radially inward of the stator, and the bus bar may be disposed radially outward of the stator core.

A vehicle power unit of the present invention includes:
  a wheel bearing including a stationary ring and a rotary ring that includes a hub flange and is rotatably supported by the stationary ring through a rolling element, the hub flange being configured to be attached with a wheel and a brake rotor of a vehicle; and
  a motor according to any one of the above-described inventions which is attached to the wheel bearing, the stator being attached to the stationary ring, and the rotor being attached to the rotary ring, wherein
  the motor is disposed radially inward with respect to an inner diameter of the brake rotor, and
  the motor is disposed in an axial range between the hub flange and an outboard side surface of a chassis frame component of the vehicle.

According to this configuration, since the motor that can have a reduced axial length as described above is attached to the wheel bearing, the vehicle power unit has a reduced overall length. Thus, the vehicle power unit can replace an existing wheel bearing without modifying constituting parts of the chassis frame component around the wheel.

In particular, the motor is disposed radially inward with respect to the inner diameter of the brake rotor, and the motor is disposed within the axial range between the hub flange and the outboard side surface of the chassis frame component, so that it is possible to secure a space for disposing the motor inside the brake rotor and to compactly accommodate the motor.

The stator core may be fixed to the stationary ring through a stator fixing part, and the bus bar may be disposed axially adjacent to the stator fixing part. In this case, the bus bar can be easily disposed, and the stator core can be attached more securely.

The bus bar may be disposed between two stator fixing parts. In this case, the stator core can be attached still more securely. Thus, it is possible to reduce vibration generated during motor operation.

The vehicle power unit may include a resin material having a thermal conductivity equal to or greater than a predefined value, the resin material being disposed in contact with a part of the bus bar and filling a space formed during attachment of the bus bar. The predefined value is an arbitrary value defined by design or the like and may be, for example, an appropriate value determined by one or both of testing and simulation.

According to this configuration, heat generated in the bus bar can be effectively released to a peripheral metal member(s) through the resin material. Thus, temperature increase in the bus bar can be suppressed.

The stator core may be fixed to the stationary ring through a stator fixing part, and the bus bar may be divided into a plurality of parts and be disposed in the stator fixing part. In this case, the stator coils are wire-connected in the bus bar, so that an axial housing space can be reduced.

A generator of the present invention includes:
  a stator including a stator core having an annular shape and stator coils wound around the stator core; and
  a rotor located opposite to the stator in a radial direction of the motor, wherein
  a bus bar is connected to the stator coils, and
  the bus bar is disposed within an axial width of the stator core.

According to this configuration, the bus bar is connected to the stator coils, and the bus bar is disposed within the axial width of the stator core, so that the generator can have a smaller axial length in comparison with a conventional technology of disposing a bus bar at an end face of coil ends because the axial length of the entire stator is reduced by a length of an axially protruding part of the stator with respect to the axial width of the stator core. Thus, even where an output is increased, the generator can be received within a limited generator housing space. Where a bus bar, instead of a common insulation-coated line, is connected to the wiring connection part at the coil ends, other devices can be more easily connected or disconnected in comparison with the case where such a common insulation-coated line is used.

A vehicle wheel bearing assembly of the present invention includes:
  a wheel bearing including a stationary ring and a rotary ring that includes a hub flange and is rotatably supported by the stationary ring through a rolling element, the hub flange being configured to be attached with a wheel and a brake rotor of a vehicle; and
  a generator according to any one of the above-described inventions which is attached to the wheel bearing, the stator being attached to the stationary ring, and the rotor being attached to the rotary ring, wherein
  the generator is disposed radially inward with respect to an inner diameter of the brake rotor, and
  the generator is disposed in an axial range between the hub flange and an outboard side surface of a chassis frame component of the vehicle.

According to this configuration, since the generator that can have a reduced axial length as described above is attached to the wheel bearing, the vehicle wheel bearing assembly has a reduced overall length. Thus, the vehicle wheel bearing assembly can replace an existing wheel bearing without modifying constituting parts of the chassis frame component around the wheel.

In particular, the generator is disposed radially inward with respect to the inner diameter of the brake rotor, and the generator is disposed within the axial range between the hub flange and the outboard side surface of the chassis frame component, so that it is possible to secure a space for disposing the generator inside the brake rotor and to compactly accommodate the generator.

The present invention encompasses any combination of at least two features disclosed in the claims and/or the specification and/or the drawings. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views. In the figures.

DESCRIPTION OF THE EMBODIMENTS

Figure 1:
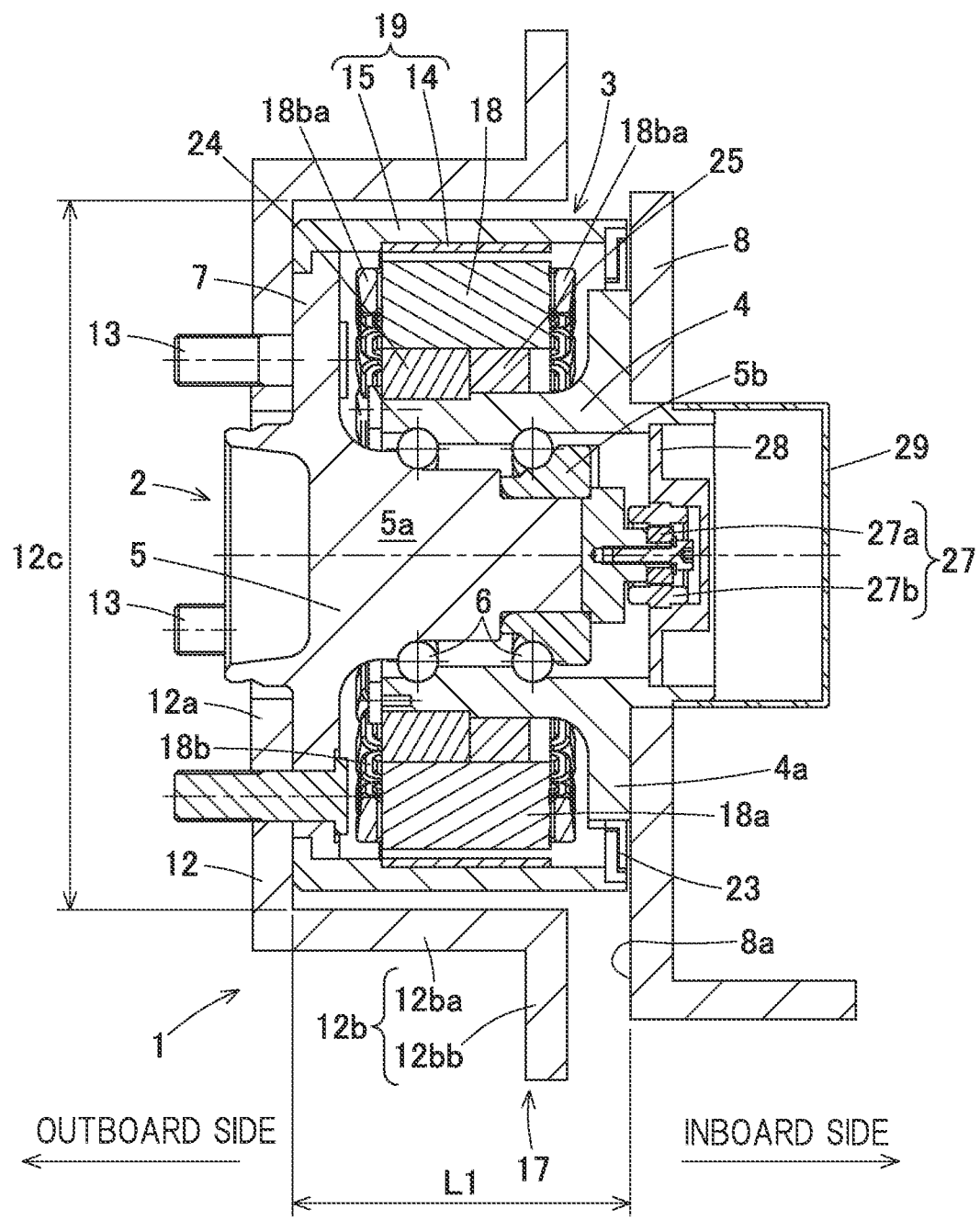
FIG. 1 is a sectional view of a vehicle power unit according to an embodiment of the present invention.

A vehicle power unit according to an embodiment of the present invention will be described with reference to FIG. 1 to FIG. 4. As shown in FIG. 1, the vehicle power unit 1 includes a wheel bearing 2 and a motor generator 3 that is a generator also serving as a motor.

Wheel Bearing 2

The wheel bearing 2 includes an outer ring 4 as a stationary ring, rolling elements 6 arranged in double rows, and an inner ring 5 as a rotary ring. A bearing space between the outer ring 4 and the inner ring 5 is filled with grease. A vehicle mount flange 4a protruding outward in a radial direction is provided on an inboard side part of an outer peripheral surface of the outer ring 4. The vehicle mount flange 4a is fixed to a knuckle 8 that is a chassis frame component. The inner ring 5 includes a hub axle 5a and a partial inner ring 5b fitted to an inboard side part of an outer peripheral surface of the hub axle 5a. The hub axle 5a includes a hub flange 7 at a position protruding with respect to the outer ring 4 toward the outboard side in an axial direction.

A brake rotor 12 and a non-illustrated wheel rim are attached to an outboard side surface of the hub flange 7 by hub bolts 13 such that the brake rotor and the wheel rim are mutually overlapped in the axial direction. A non-illustrated tire is attached to an outer periphery of the rim. In the present description, the term "outboard side" refers to a side closer to an outside of a vehicle in a widthwise direction of the vehicle in a state where the vehicle power unit 1 is mounted in the vehicle, and the term "inboard side" refers to a side closer to a center of the vehicle in the widthwise direction of the vehicle.

Brake 17

Figure 12:
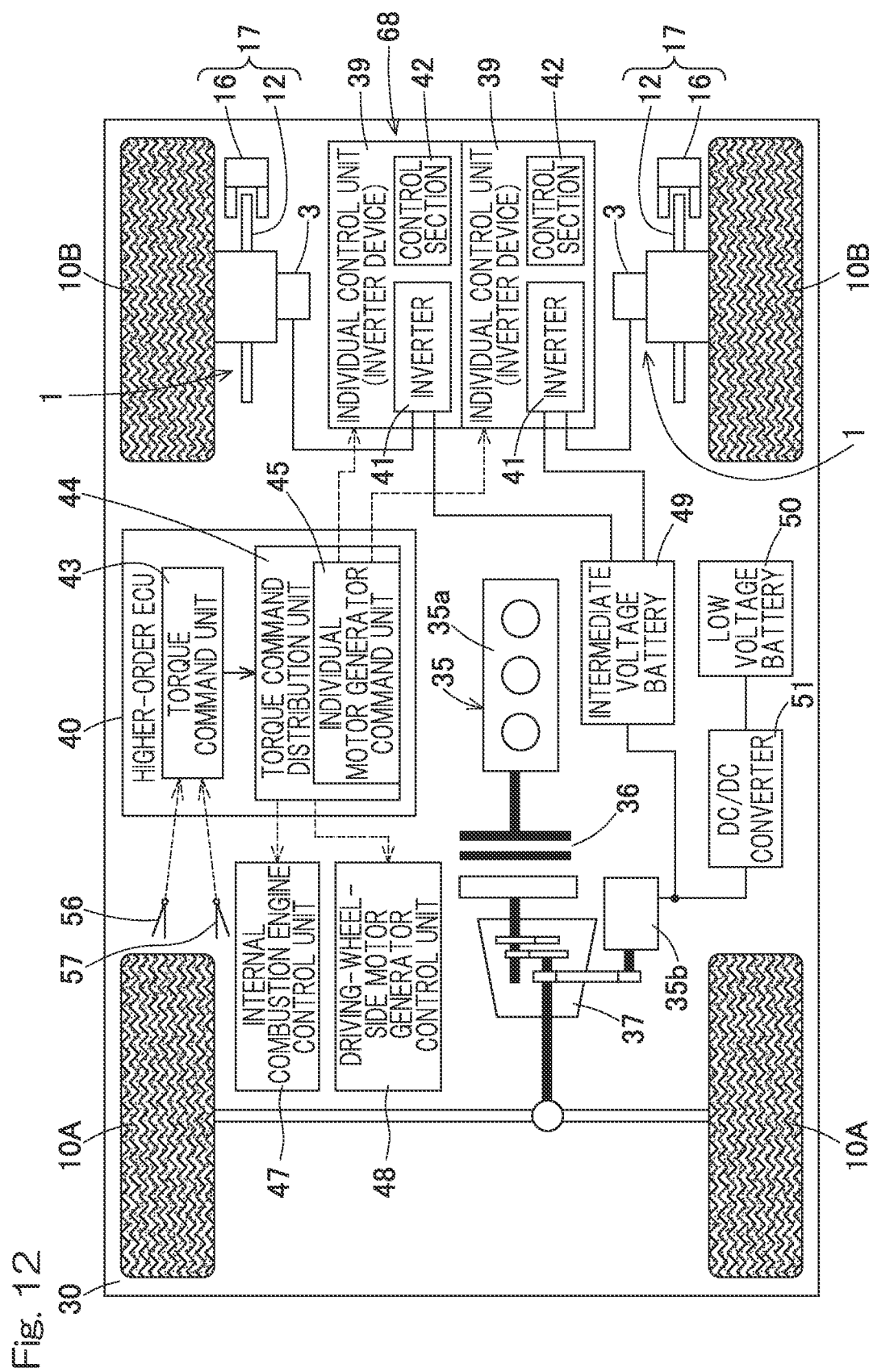
FIG. 12 is a block diagram illustrating a conceptual feature of a vehicle system for a vehicle including any of the vehicle power units.

The brake 17 is a friction brake including a brake rotor 12 of a disk shape and a brake caliper 16 (FIG. 12). The brake rotor 12 includes a plate-like part 12a and an outer peripheral part 12b. The plate-like part 12a is an annular and plate-like member that is overlapped with the hub flange 7. The outer peripheral part 12b includes a cylindrical portion 12ba that extends from an outer peripheral edge portion of the plate-like part 12a toward the inboard side in a cylindrical manner and a plate portion 12bb that extends from an inboard side end of the cylindrical portion 12ba toward an outer diameter side in a plate-like manner.

The brake caliper 16 (FIG. 12) is attached to the knuckle 8 that is a chassis frame component of the vehicle (not illustrated), and includes friction pads (not illustrated) that hold the plate portion 12bb therebetween. The brake caliper 16 (FIG. 12) may be of a hydraulic or mechanical type. Alternatively, the brake caliper may be of an electric motor-driven type.

Motor Generator 3

The motor generator 3 of this example is a motor generator for travel assistance which can generate power by rotation of a wheel and can be fed from an external source to rotatably drive the wheel. The motor generator 3 includes a stator 18 and a rotor 19 located opposite to the stator 18 in the radial direction. The motor generator 3 is an outer rotor type generator in which the rotor 19 is located outward of the stator 18 in the radial direction. Alternatively, the motor generator 3 is a direct drive type generator in which the rotor 19 is attached to the inner ring 5 that is a rotary ring of the wheel bearing 2.

The motor generator 3 is disposed radially inward with respect to an inner diameter 12c of the brake rotor 12 and within an axial range L1 between the hub flange 7 and the outboard side surface 8a of the knuckle 8. For example, the motor generator 3 may be a surface permanent magnet motor of an outer-rotor type, i.e., an SPM (surface permanent magnet) synchronous motor (or also abbreviated as an SPMSM (surface permanent magnet synchronous motor)).

Alternatively, the motor generator 3 may be an IPM (interior permanent magnet) synchronous motor (or also abbreviated as an IPMSM (interior permanent magnet synchronous motor)). Besides, the motor generator 3 may be of any type, such as a switched reluctance motor (abbreviated as SR motor) and an induction motor (abbreviated as IM). In any of the motor types, the stator 18 may have any winding form, such as distributed winding or concentrated winding.

The rotor 19 includes a rotary casing 15 of a cylindrical shape that is attached to the outer peripheral edge part of the hub flange 7 and a plurality of permanent magnets 14 disposed on an inner peripheral surface of the rotary casing 15. The rotary casing 15 is made of, e.g., a soft magnetic material and has a cylindrical shape concentric with the inner ring 5. The rotary casing 15 may be formed as an integrated metal component by cutting or casting or be constituted by a plurality of divided structural bodies that are fixed together by, e.g., welding or bonding. The rotary casing 15 has an inner peripheral surface formed with a plurality of recessed portions at equal intervals in a circumferential direction, and the permanent magnets 14 are fitted into the respective recessed portions and are fixed by, e.g., bonding.

Figure 2:
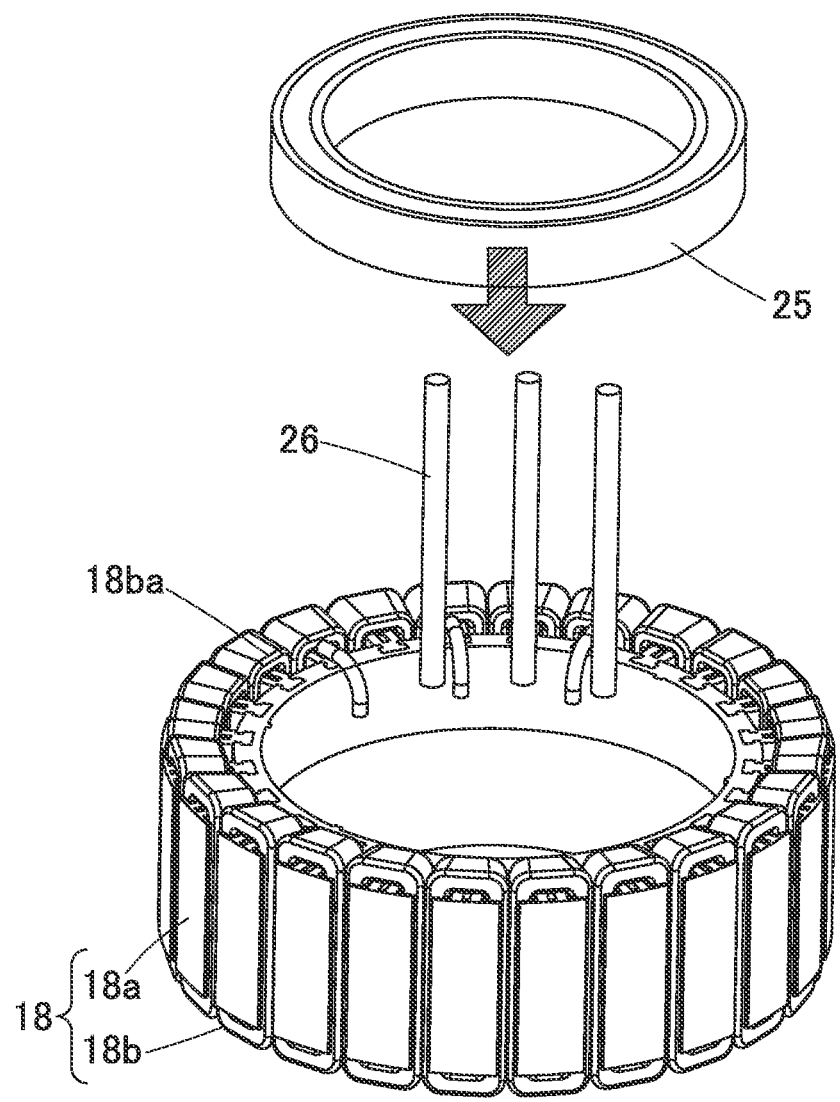
FIG. 2 is an exploded perspective view of a motor stator of the vehicle power unit.
Figure 3:
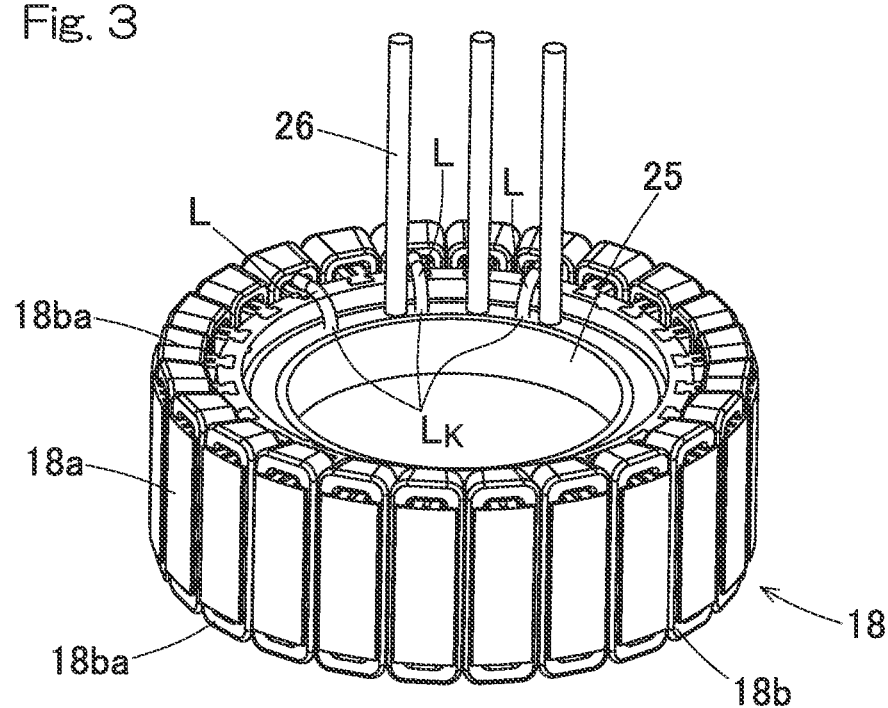
FIG. 3 is a perspective view of the motor stator.
Figure 4:
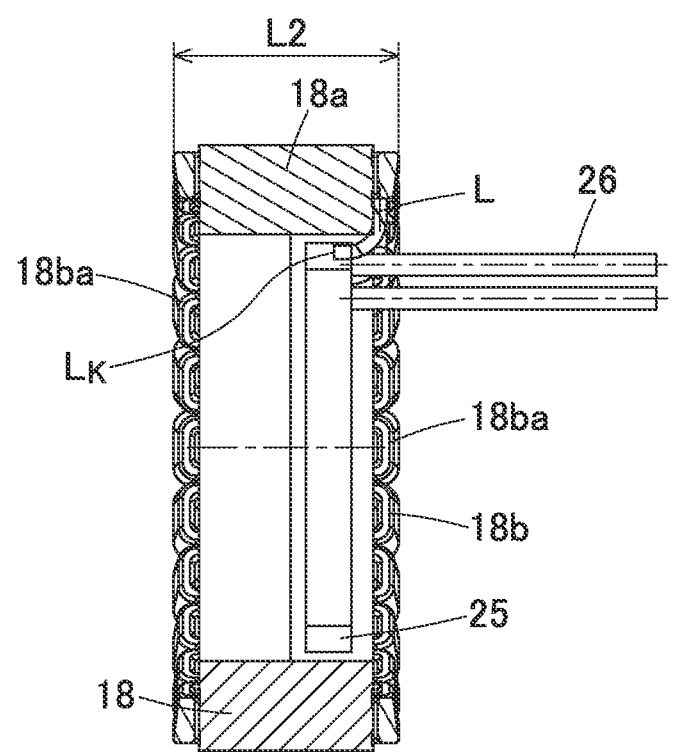
FIG. 4 is a sectional view of the motor stator.

As shown in FIG. 2 and FIG. 3, the stator 18 includes a stator core 18a having an annular shape and stator coils 18b wound around the stator core 18a. The stator core 18a is made of, e.g., a silicon steel sheet, a powder magnetic core, and an amorphous alloy. As shown in FIG. 4, each of the stator coils 18b has coil ends 18ba that protrude to opposite axial sides with respect to the axial width of the stator core 18a. The axial width between the coil ends 18ba corresponds to an overall length L2 of the stator 18.

As shown in FIG. 1, the stator core 18a is attached to the outer peripheral surface of the outer ring 4 through a stator fixing part 24. The outer ring 4 has an annular recess that is recessed radially inward by a predetermined small distance on the outboard side part of the outer peripheral surface, and the stator fixing part 24 of a cylindrical shape is fitted and fixed in the annular recess by, e.g., press fitting.

Bus Bar 25

As shown in FIG. 4, a bus bar 25 is connected to wiring connection parts Lk at the coil ends 18ba, and the bus bar 25 is disposed inward with respect to the axial width of the stator core 18a, for example, at a position where the bus bar 25 is overlapped with the stator core 18a in the axial direction. In this example, a bus bar 25 having an annular shape is disposed radially inward of the stator core 18a. Lines L extend radially inward from the coil ends 18ba, and the respective lines L are further curved radially inward of the stator core 18a.

As shown in FIG. 2 and FIG. 3, the bus bar 25 is inserted into an inner peripheral part of the stator core 18a, and the lines L from the respective stator coils 18b are connected to the bus bar 25. The wiring connection parts Lk refer to points at which the respective lines L are connected. Further, a three-core motor line 26 is connected to the bus bar 25. Also, the bus bar 25 is disposed on the inner peripheral part of the stator core 18a and at a position adjacent to the stator fixing part 24 (FIG. 1) in the axial direction (on the inboard side).

Sealing Structure

As shown in FIG. 1, a sealing member 23 for preventing entry of water and external objects into the inside of the motor generator 3 and the wheel bearing 2 is disposed between the inboard side part of the inner peripheral surface of the rotary casing 15 and the outer peripheral surface of the vehicle mount flange 4a.

Rotation Detector 27

The vehicle power unit 1 includes a rotation detector 27. The rotation detector 27 is configured to detect a rotation angle or a rotation speed of the inner ring 5 with respect to the outer ring 4 in order to control the rotation of the motor generator 3 for drive assistance. The rotation detector 27 includes a to-be-detected part 27a attached to, e.g., a to-be-detected part holding member and a sensor part 27b configured to detect the to-be-detected part 27a. The sensor part 27b is fixed to an inboard side part of an inner peripheral surface of the outer ring 4 through a sensor fixing member 28. The rotation detector 27 may be, for example, a resolver. It should be noted that the rotation detector 27 is not limited to a resolver and may be any of, for example, an encoder, a pulser ring, and a hall sensor, irrespective of the types.

Cover 29 and the Like

A cylindrical cover 29 for covering an inboard side end of the outer ring 4 is attached to the inboard side end. The cover 29 supports the motor line 26 (FIG. 4) of the motor generator 3, for example, through a power line connector of a panel mount type (not illustrated). The cover 29 also supports a non-illustrated sensor connector, and the sensor connector supports non-illustrated wiring extending from the sensor part 27b.

Effects and Advantages

According to the above-described motor generator 3, the bus bar 25 is connected to the wiring connection parts Lk at the coil ends 18ba, and the bus bar 25 is attached to the inner peripheral part of the stator core 18a, so that the stator overall length L2 can be reduced in comparison with a conventional technology of disposing a bus bar at an end face of coil ends because the axial length of the entire stator is reduced by a length of an axially protruding part of the stator with respect to the axial width of the stator core 18a. Thus, even where a motor output is increased, the motor generator 3 can be received within a limited motor housing space. Since the bus bar 25, instead of a common insulation-coated line, is used in the wiring connection parts at the coil ends 18ba, other devices can be more easily connected or disconnected in comparison with the case where such a common insulation-coated line is used. Since the motor generator 3 is of an outer rotor type, and the bus bar 25 is disposed radially inward of the stator core 18a, the area in which the rotor 19 and the stator 18 are opposed can be increased when compared with that in an inner rotor type motor. This makes it possible to maximize an output torque within a limited space.

According to the above-described vehicle power unit 1, the motor generator 3 that can have a reduced axial length as described above is attached to the wheel bearing 2, so that the vehicle power unit 1 has a reduced overall length. Thus, the vehicle power unit 1 can replace an existing wheel bearing without modifying constituting parts of the knuckle 8 around the wheel. In particular, the motor generator 3 is disposed radially inward with respect to the inner diameter 12c of the brake rotor 12, and the motor generator 3 is disposed within the axial range L1 between the hub flange 7 and the outboard side surface 8a of the knuckle 8, so that it is possible to secure a space for disposing the motor generator 3 inside the brake rotor 12 and to compactly accommodate the motor generator 3.

Since the bus bar 25 is disposed adjacent to the stator fixing part 24 in the axial direction, the bus bar 25 can be easily disposed, and the stator core 18a can be attached more securely. Since the motor generator 3 is a direct drive type generator in which the rotor 19 is attached to the inner ring 5 that is a rotary ring of the wheel bearing 2, the entire vehicle power unit has a smaller number of components and has a simple and space-saving structure when compared with a unit including a speed reduction gear or a speed reducer etc., so that it is possible to suppress increase in vehicle weight.

Other Embodiments

In the following description, features corresponding to those described for the above embodiment are denoted with like reference numerals, and overlapping description will not be repeated. Where description is made only to a part of a feature, other part of the feature is the same as that of the embodiment described above, unless specifically indicated otherwise. Like features provide like effects. Combination of parts is not limited to those specifically described in the respective embodiments, and parts of the embodiments can also be combined as long as such a combination does not particularly cause a problem.

Figure 5:
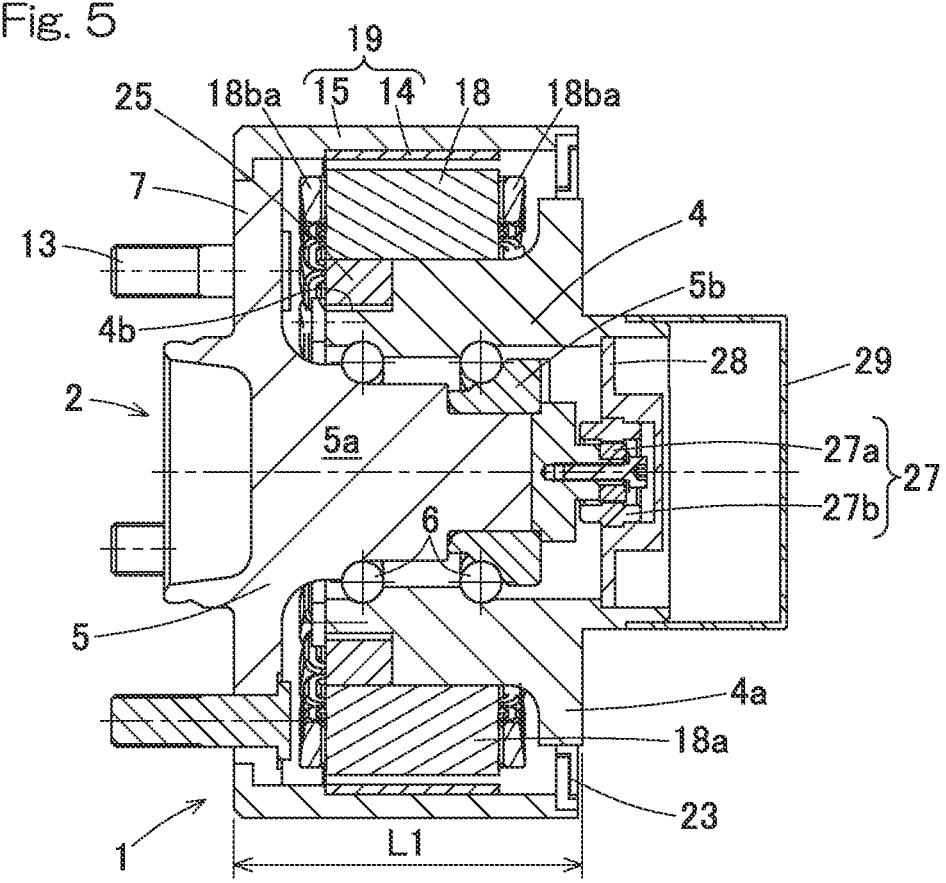
FIG. 5 is a sectional view of a vehicle power unit according to another embodiment of the present invention.

As shown in FIG. 5, the outer ring 4 may have an annular recess 4b that is recessed radially inward on outboard side part of the outer peripheral surface, and the bus bar 25 may be disposed in the annular recessed portion 4b. In this case, the stator fixing part is not necessary, so that it is possible to reduce the number of components and simplify the structure. The rest of the configuration is the same as above.

Figure 6:
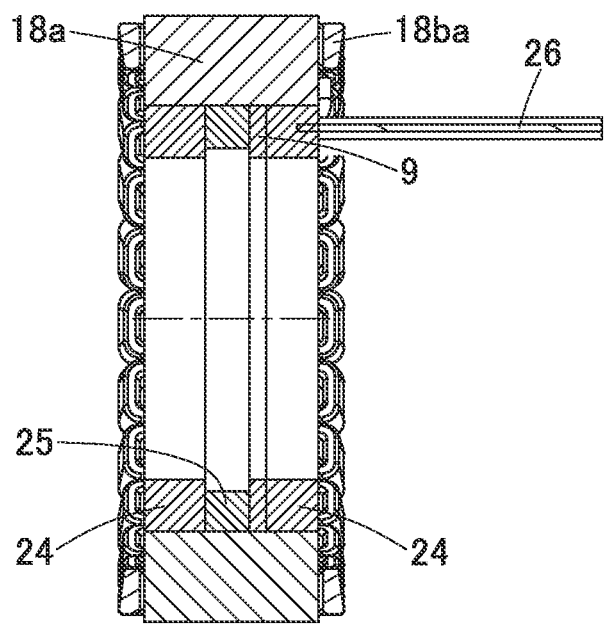
FIG. 6 is a sectional view of a motor stator according to yet another embodiment of the present invention.

As shown in FIG. 6, the bus bar 25 may be disposed at a position radially inward of the stator core 18a and between two stator fixing parts 24, 24. An axial space defined between one of the stator fixing parts 24 and the bus bar 25 is filled with, for example, a resin material 9 having a thermal conductivity of about 1 to 3 (W/m·K). In this structure, since the stator core 18a is fixed to the outer ring 4 (FIG. 1) through the two stator fixing parts 24, 24, the stator core 18a can be attached still more securely. Thus, it is possible to reduce vibration generated during motor operation. Also, heat generated in the bus bar 25 can be released to a peripheral metal member(s) (for example, the outer ring) through the resin material 9, so that temperature increase in the bus bar 25 can be suppressed.

Figure 7:
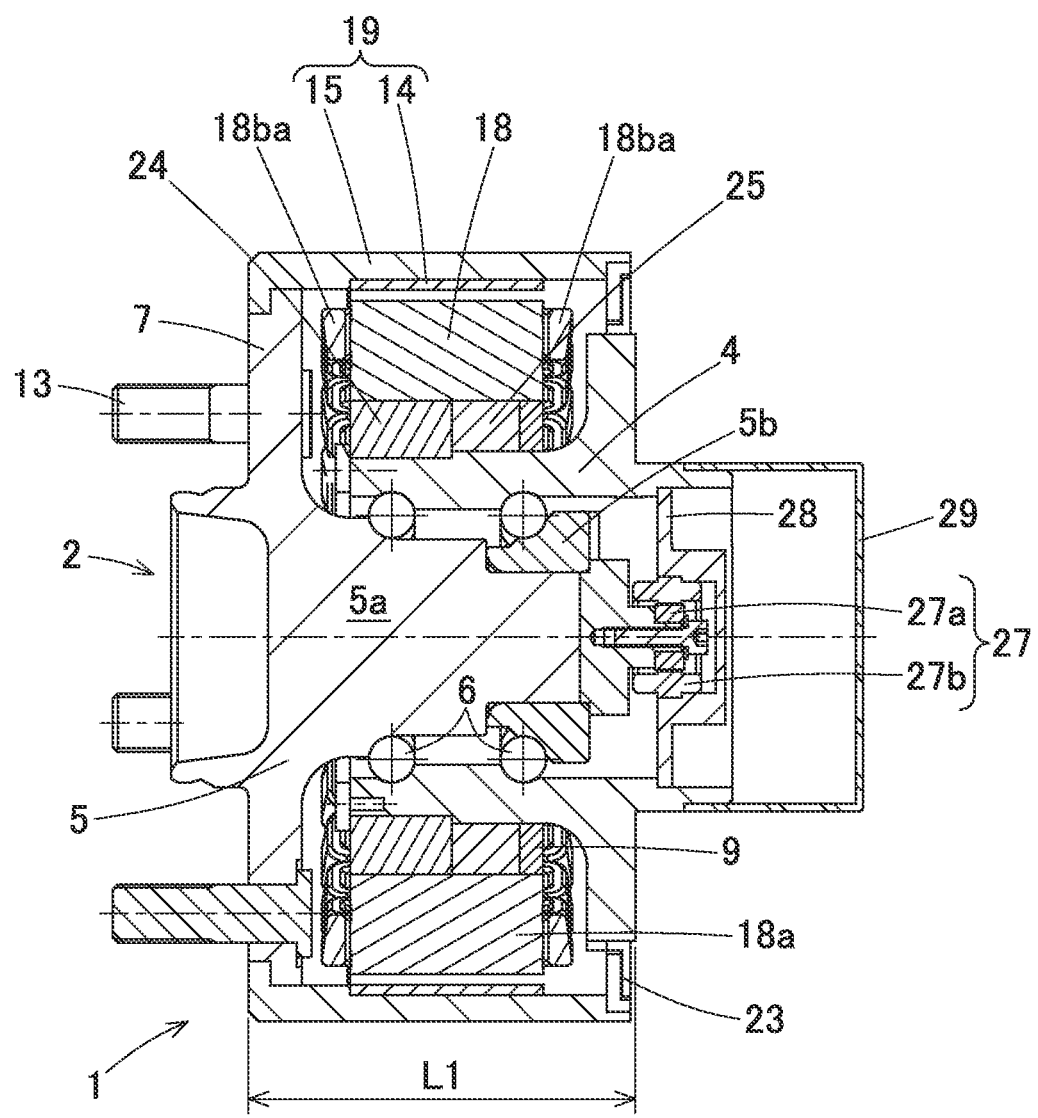
FIG. 7 is a sectional view of a vehicle power unit according to still another embodiment of the present invention.

As shown in FIG. 7, a space formed during attachment of the bus bar may be filled with a resin material 9 having a thermal conductivity of, for example, about 1 to 3 (W/m·K). The rest of the configuration is the same as that of the embodiment shown in FIG. 1. According to the configuration of FIG. 7, the heat generated in the bus bar 25 can be released to a peripheral metal member(s) (for example, the outer ring 4) through the resin material 9, so that temperature increase in the bus bar 25 can be suppressed. In FIG. 7, the bus bar 25 is disposed between the stator fixing part 24 and the resin material 9.

Figure 8:
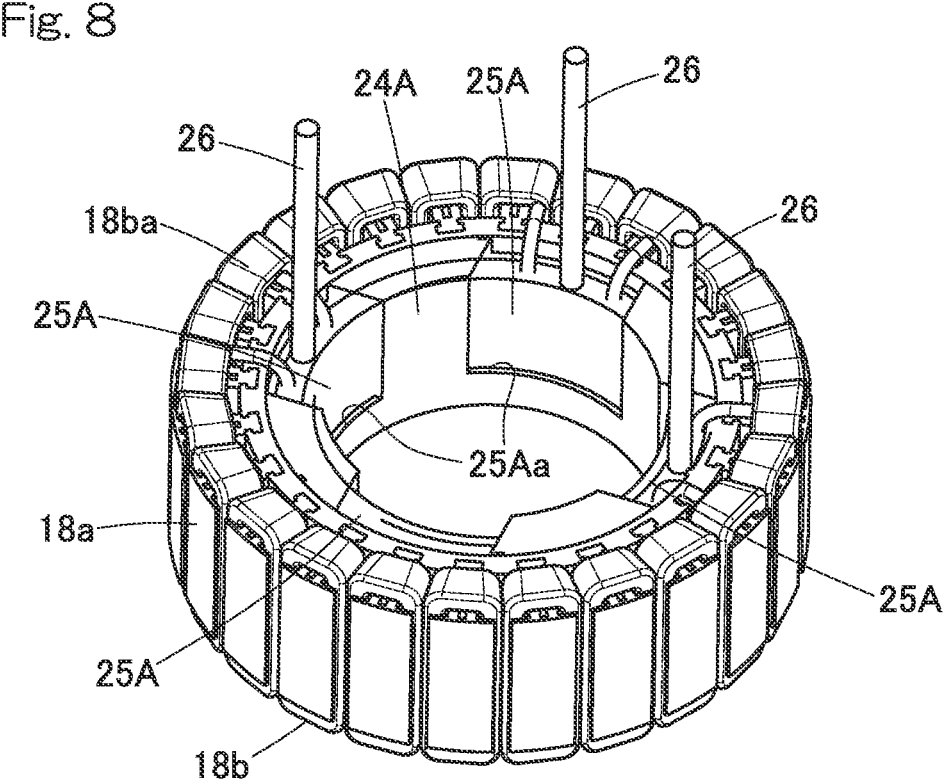
FIG. 8 is a perspective view of a motor stator according to a further embodiment of the present invention.

As shown in FIG. 8, bus bars 25A divided as a plurality (four in this example) of parts may be disposed in the stator fixing part 24A. The stator fixing part 24A has a crown shape in which a plurality of recessed portions 25Aa each extending from an inboard side end face over a predetermined distance in the axial direction are formed at multiple (four in this example) positions at equal intervals in a circumferential direction, and the respective bus bars 25A are fitted in the corresponding recessed portions 25Aa. In the example of FIG. 8, each of the bus bars 25A has an end face in contact with a bottom part of each recessed portion 25Aa. According to this configuration, the stator coils 18b are wire-connected in the bus bars 25A, and a three-core motor line 26 is led out therefrom. Since the stator coils 18b are connected in the bus bars 25A, an axial housing space can be reduced.

Figure 9:
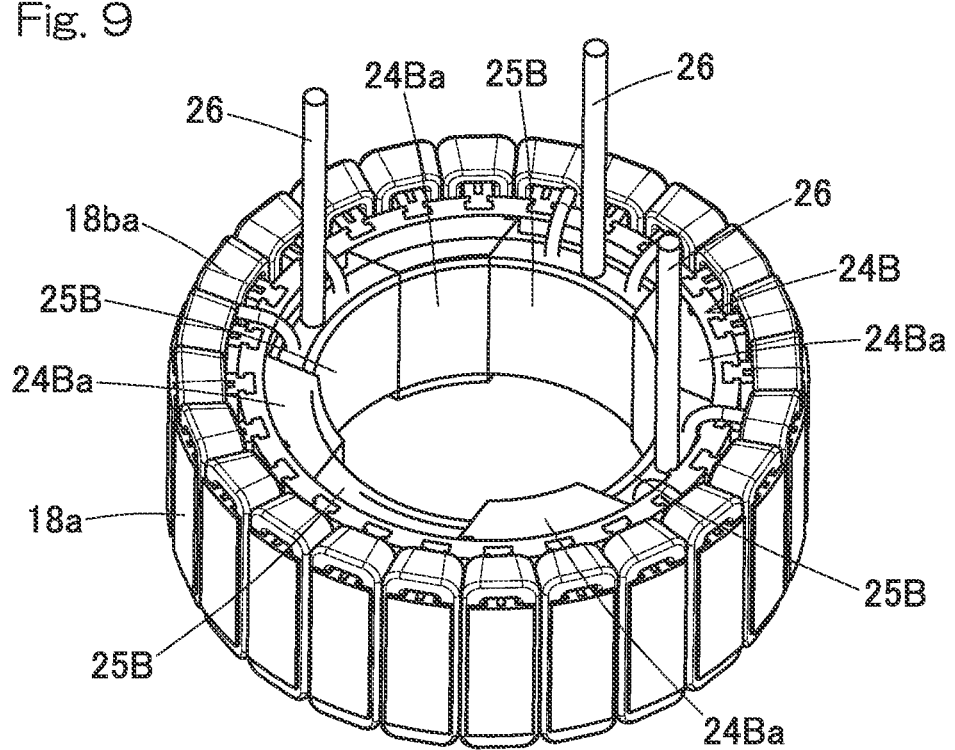
FIG. 9 is a perspective view of a motor stator according to a still further embodiment of the present invention.

As shown in FIG. 9, a stator fixing part 24B may include a plurality of stator-fixing-part divided bodies 24Ba arranged at equal intervals in a circumferential direction, and the bus bars 25B may be interposed between the adjacent stator-fixing-part divided bodies 24Ba, 24Ba in the circumferential direction. In this case, the same effects and advantages can also be provided as those of the configuration of FIG. 8. It should be noted that although the bus bar is divided into four in the examples of FIG. 8 and FIG. 9, the number of divisions may not necessarily be four.

Figure 10:
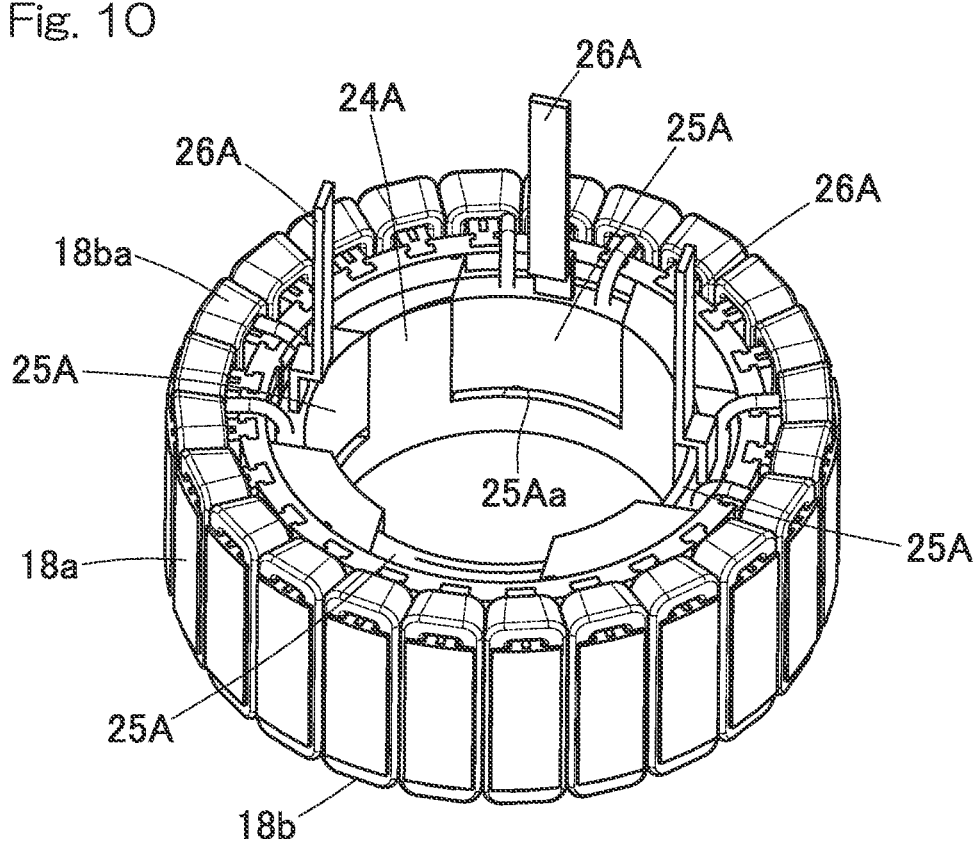
FIG. 10 is a perspective view of a motor stator according to a yet further embodiment of the present invention.

As shown in FIG. 10, instead of the motor line 26 (FIG. 8, FIG. 9), a conductor inside the bus bar 25A may be extended to the inboard side and be led out as a conductor extension part 26A. In this case, a motor line can be omitted, so that the motor wiring connection is facilitated.

Figure 11:
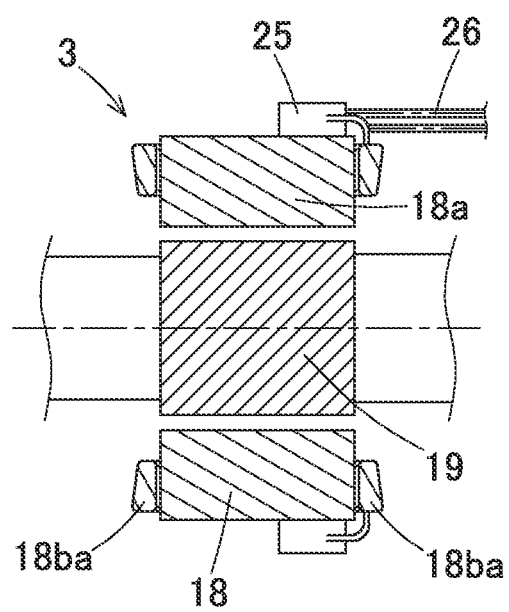
FIG. 11 is a sectional view schematically illustrating an inner rotor type motor according to still another embodiment of the present invention.

Although the description of the vehicle power unit is made with reference to a motor generator of an outer rotor type, the motor generator 3 may be of an inner rotor type in which the rotor 19 is located radially inward of the stator 18, as shown in FIG. 11. In this case, the bus bar 25 is disposed radially outward of the stator core 18a. In this inner rotor type configuration, the motor generator 3 can also have a reduced axial length in comparison with a conventional technology of disposing a bus bar at an end face of coil ends because the axial length of the entire stator is reduced by a length of an axially protruding part of the stator with respect to the axial width of the stator core.

Vehicle System

FIG. 12 is a block diagram illustrating a conceptual feature of a vehicle system including a vehicle power unit 1 according to any of the above embodiments. In this vehicle system, the vehicle power unit 1 is installed in a driven wheel 10B in a vehicle including the driven wheel 10B mechanically unconnected to a main drive source. A wheel bearing 2 (FIG. 1) in the vehicle power unit 1 is a bearing for supporting the driven wheel 10B.

The main drive source 35 may be an internal combustion engine such as a gasoline engine or a diesel engine, or a motor generator (electric motor), or a hybrid type drive source in which an internal combustion engine and a motor generator are combined. The term "motor generator" refers to an electric motor capable of generating power when rotation is applied. In the illustrated example, the vehicle 30 is a front-wheel drive vehicle including driving wheels 10A as front wheels and driven wheels 10B as rear wheels, and is a hybrid vehicle (hereinafter, sometimes referred to as "HEV") including main drive sources 35 including an internal combustion engine 35a and a driving-wheel-side motor generator 35b.

Specifically, the vehicle is of a mild hybrid type in which the driving-wheel-side motor generator 35b is driven at an intermediate voltage of, e.g., 48V. Hybrid vehicles are generally categorized into strong hybrids and mild hybrids: the mild hybrids refer to hybrid vehicles that have an internal combustion engine as a main drive source and use a motor mainly to assist travelling when they start moving and/or accelerate, and they are distinguished from the strong hybrids in that the mild hybrids can normally travel in an EV (electric vehicle) mode only for a while, but not for a long time. The internal combustion engine 35a in the illustrated example is connected to a drive shaft of the driving wheels 10A via a clutch 36 and a speed reduction gear or a speed reducer 37, and the driving-wheel-side motor generator 35b is connected to the speed reduction gear or a speed reducer 37.

The vehicle system includes: motor generators 3 that are generators for travel assistance that rotationally drive the driven wheels 10B; individual control units 39 that control the motor generators; and an individual motor generator command unit 45 that is provided in a higher order ECU 40 and outputs a command for causing the individual control units 39 to control driving and power regeneration. The motor generators 3 are connected to a power storage unit. The power storage unit may be, e.g., a battery (rechargeable battery) or a capacitor. Although the power storage unit may be of any type and be positioned anywhere in the vehicle 30, in this embodiment, it corresponds to an intermediate voltage battery 49, among a low voltage battery 50 and the intermediate voltage battery 49 installed in the vehicle 30.

The motor generators 3 for the driven wheels are direct drive motors in which no speed reduction gear or speed reducer is used. The motor generators 3 operate as electric motors when supplied with power and also serve as generators for converting kinetic energy of the vehicle 30 into electric power. Since each motor generator 3 has a rotor 19 (FIG. 1) attached to an inner ring 5 (FIG. 1), the inner ring 5 (FIG. 1) is rotationally driven when current is applied to the motor generator 3, whereas regenerative power is generated when an induction voltage is applied during power regeneration. The motor generator 3 has a drive voltage for rotationally driving or a regenerative voltage of 100 V or lower.

Control System of Vehicle 30

The higher order ECU 40 is a unit for performing integrated control of the vehicle 30 and includes a torque command generation unit 43. The torque command generation unit 43 generates a torque command in accordance with a signal of an operation amount inputted from each of an accelerator operation unit 56 (such as an accelerator pedal) and a brake operation unit 57 (such as a brake pedal). The vehicle 30 includes an internal combustion engine 35a and a driving-wheel-side motor generator 35b as main drive sources 35 as well as two motor generators 3, 3 for driving the two respective driven wheels 10B, 10B. Accordingly, the higher order ECU 40 is provided with a torque command distribution unit 44 for distributing the torque command(s) to the respective drive sources 35a, 35b, 3, 3 in accordance with a predetermined rule.

A torque command to the internal combustion engine 35a is transmitted to an internal combustion engine control unit 47 and is used, e.g., to control a valve opening degree by the internal combustion engine control unit 47. A torque command to the driving-wheel-side motor generator 35b is transmitted to and executed on a driving-wheel-side motor generator control unit 48. Torque commands to the generators 3, 3 on the driven wheel side are transmitted to the individual control units 39, 39. The individual motor generator command unit 45 refers to a section of the torque command distribution unit 44 which performs output to the individual control units 39, 39. The individual motor generator command unit 45 also has a function of providing each individual control unit 39 with a torque command that is a command of a distributed braking force to be produced by each motor generator 3 through regenerative braking in response to a signal of an operation amount from the brake operation unit 57. The individual motor generator command unit 45 and the individual control units 39 constitute a control unit 68 for controlling the motor generators 3.

Each of the individual control units 39 is an inverter device and includes: an inverter 41 for converting direct current from the intermediate voltage battery 49 into a three-phrase alternating current voltage; and a control section 42 for controlling an output of the inverter 41 in accordance with, e.g., the torque command, by, e.g., PWM control. The inverter 41 includes: a bridge circuit (not illustrated) in the form of, e.g., a semi-conductor switching element; and a charge circuit (not illustrated) for charging the intermediate voltage battery 49 with the regenerative power from the motor generator 3. It should be noted that although each of the individual control units 39 is separately provided to each of the two motor generators 3, 3, the two individual control units 39, 39 may be disposed in a single enclosure and share a control section 42 in common.

Figure 13:
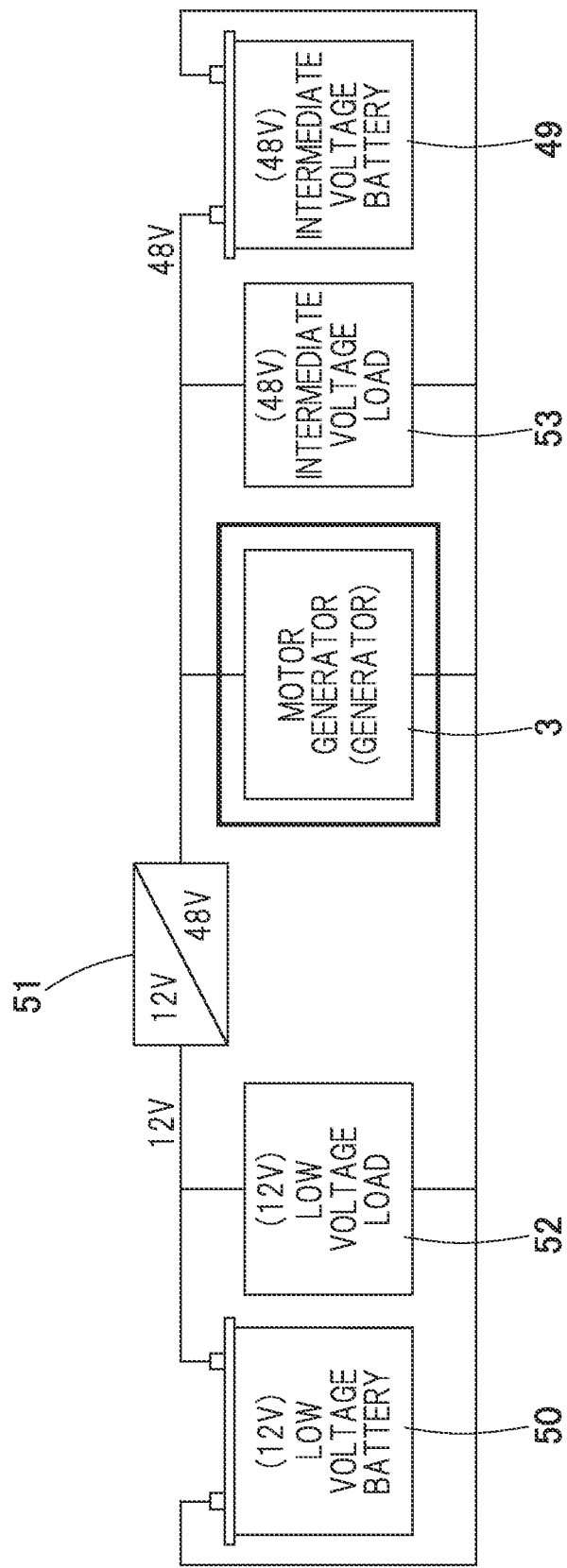
FIG. 13 is a power system diagram as an example of a vehicle including the vehicle system.

FIG. 13 is a power system diagram of an exemplary vehicle (FIG. 12) equipped with the vehicle system. In the example of FIG. 13, there are a low voltage battery 50 and an intermediate voltage battery 49 as batteries, and the batteries 49, 50 are connected through a DC/DC convertor 51. There are two motor generators 3, but only one of them is illustrated as a representative. Although the driving-wheel-side motor generator 35b in FIG. 12 is not illustrated in FIG. 13, it is connected to an intermediate voltage system in parallel with the motor generator 3 on the driven wheel side. A low voltage load 52 is connected to a low voltage system, and an intermediate voltage load 53 is connected to the intermediate voltage system. There are a plurality of the low voltage loads 52 and a plurality of the intermediate voltage loads 53, but only one for each type is illustrated as a representative.

The low voltage battery 50 is a battery that is commonly used as a power source for, e.g., a control system in various automobiles, and may be, for example, 12 V or 24 V. The low voltage load 52 may include a starter motor of the internal combustion engine 35a, lights, and key components, such as the higher order ECU 40 and other ECU (not illustrated). The low voltage battery 50 may be also called as an auxiliary battery for electric accessories, and the intermediate voltage battery 49 may be also called as an auxiliary battery for an electric system.

The intermediate voltage battery 49 has a voltage higher than that of the low voltage battery 50 but lower than that of a high voltage battery (100 V or higher, for example, about 200 to 400 V) used for, e.g., strong hybrid vehicles, the voltage having a negligible influence to a human body when an electric shock occurs during operation. The intermediate voltage battery may preferably be a 48-V battery that are used in mild hybrids in recent years. The intermediate voltage battery 49, such as a 48-V battery, can be relatively easily installed in a vehicle equipped with a conventional internal combustion engine, and such a vehicle can be converted into a mild hybrid so as to reduce fuel consumption through power assistance by electric power and/or power regeneration.

The intermediate voltage loads 53 in the 48-V system are the accessory components, including the power-assist motor that is the driving-wheel-side motor generator 35b, an electric pump, an electric power steering, a supercharger, an air compressor, or the like. Since the loads from the accessories are set up as the 48-V system, the system can reduce the possibility of an electric shock to a passenger or a maintenance operator, although the system can provide a reduced output of power assistance compared with that of a high voltage system (such as a strong hybrid vehicle with a voltage of 100 V or higher). The system also allows an insulation coating for wiring to be thin, so that the weight and/or volume of the wiring can be reduced. In addition, the system can input/output a larger electric power with a smaller amount of current than that of a 12-V system, so that the volume of the electric motor or the generator can be reduced. Thus, the system contributes to the effect of reducing fuel consumption of the vehicle.

This vehicle system is suitable for accessory components of such a mild hybrid vehicle and is applied as a power-assist and power-regenerative component. It should be noted that although conventionally, a mild-hybrid vehicle sometimes includes a CMG (crankshaft motor-driven generator), a GMG (gearbox motor-driven generator), or a belt-driven starter motor (none of them are illustrated), all of these are affected by efficiency of a transmission device and a speed reduction gear or a speed reducer because they perform power assistance or power regeneration for an internal combustion engine or a power device.

In contrast, since the vehicle system of this embodiment is mounted in the driven wheel 10B, the vehicle system is unconnected to the main drive sources such as the internal combustion engine 35a and the electric motor (not illustrated) and can directly use kinetic energy of the vehicle body in power regeneration. In cases where a CMG or a GMG, or a belt-driven starter motor is provided, its incorporation has to be taken into consideration from a designing phase of the vehicle 30, and thus it is difficult to retrofit these components.

In contrast, the motor generator 3 of this vehicle system, which can be accommodated inside the driven wheel 10B, can be attached even to a finished vehicle in a number of steps equivalent to that for replacing a component, making it possible to set up a 48-V system even to the finished vehicle including only an internal combustion engine 35a. An existing vehicle including only an internal combustion engine 35a can be converted into a mild hybrid vehicle by installing a vehicle power device 1 according to any of the above embodiments and the intermediate voltage battery 49 having a drive voltage or a regenerative voltage of 100 V or lower as a battery for the motor generator, without significant modifications of the vehicle. The vehicle installed with the vehicle system according to this embodiment may be provided with a different motor generator 35b for auxiliary driving, as in the example shown in FIG. 12. In such a case, an amount of power assistance or an amount of regenerative power provided to the vehicle 30 can be increased, contributing to further reduction in fuel consumption.

Figure 14:
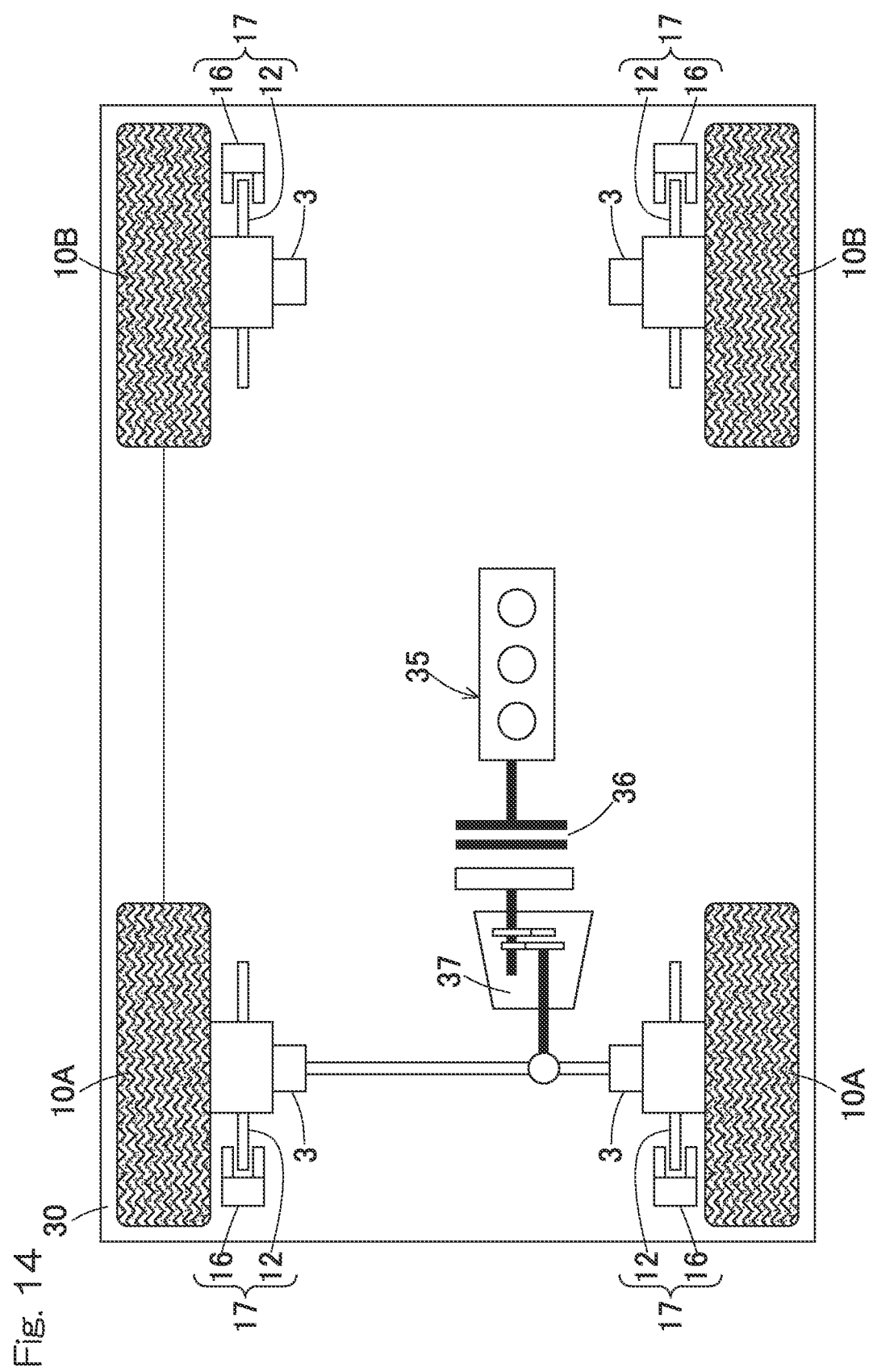
FIG. 14 illustrates conceptual features of a vehicle system for another vehicle including the vehicle power unit.
Figure 15:
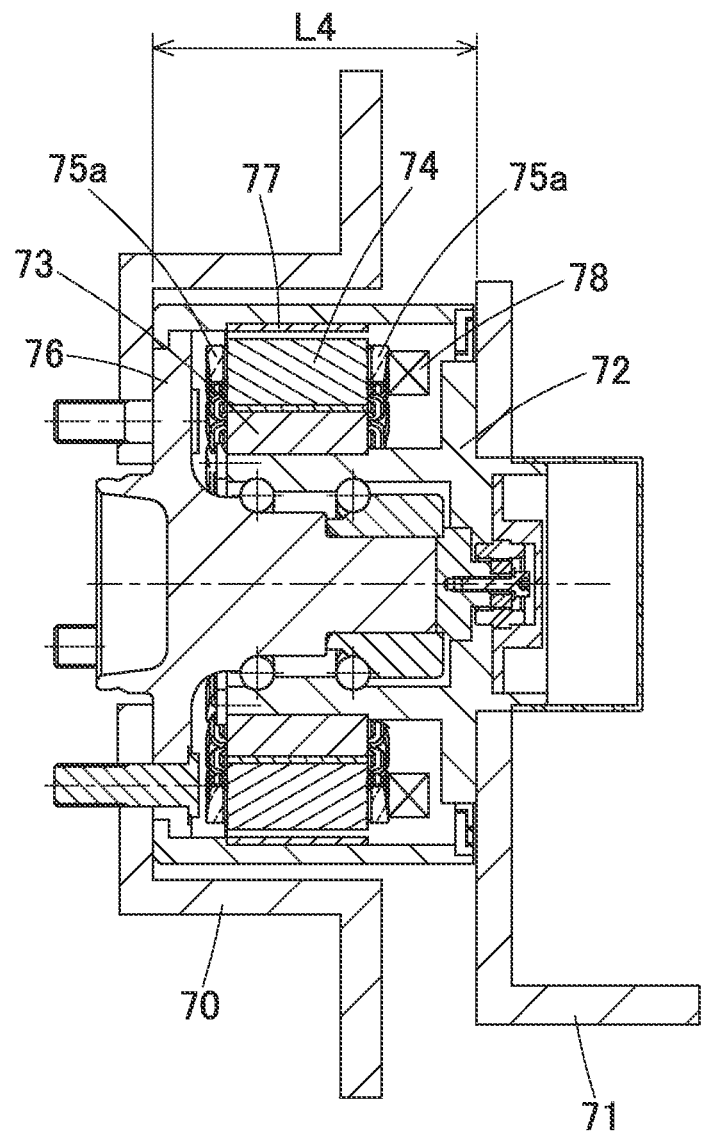
FIG. 15 is a sectional view of a conventional vehicle power unit including a drive motor having a power generation function.
Figure 16:
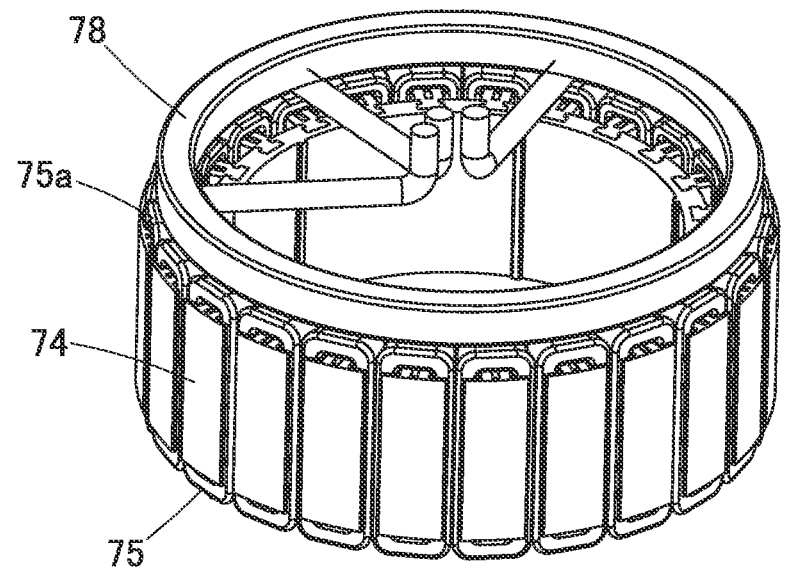
FIG. 16 is a perspective view of a conventional drive motor.
Figure 17:
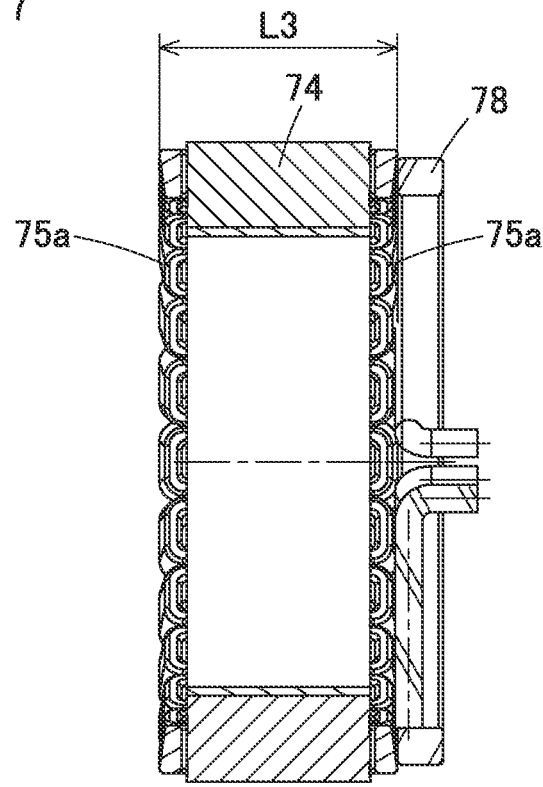
FIG. 17 is a sectional view of the drive motor.

FIG. 14 shows an example in which vehicle power units 1 according to any of the embodiments are applied to driving wheels 10A as front wheels and driven wheels 10B as rear wheels. The driving wheels 10A are driven by a main drive source 35 including an internal combustion engine through a clutch 36 and a speed reduction gear or a speed reducer 37. This front-wheel drive vehicle includes the vehicle power units 1 for supporting and auxiliarily driving the respective driving wheels 10A and driven wheels 10B. In such a way, the vehicle power units 1 may be applied not only to the driven wheels 10B but also to the driving wheels 10A.

The vehicle system shown in FIG. 12 may be a system that has a function of generating power but does not perform rotational drive when supplied with power. In this case, regenerative power generated by the motor generator 3 can be stored in the intermediate voltage battery 49 so that a braking force can be generated. Appropriate use of such a system in combination with or alternative to the mechanical brake operation unit 57 makes it possible to improve braking performance. Thus, when limited to the function of generating power, each individual control unit 39 may be in the form of an AC/DC converter device (not illustrated), instead of an inverter device. The AC/DC converter device has a function of converting three-phase alternating current voltage to direct current voltage so as to charge the intermediate voltage battery 49 with the regenerative power from the motor generator 3, and the AC/DC converter device can be controlled more easily and can have a more compact configuration than an inverter.

In addition, although the vehicle power unit 1 of the present application is described as having a third-generation structure in which the vehicle power unit includes a hub axle having a partial inner ring fitted thereto as a rotary ring and is constituted by an outer ring as a stationary ring and a fitted body of the hub axle and the partial inner ring, the structure is not limited to this.

The rotary ring of the present invention refers to a structure body including a hub having a hub flange and a member having a raceway surface for a rolling element. For example, the vehicle power unit may have a first-generation structure including an outer ring mainly serving as a stationary ring and an inner ring fitted to an outer peripheral surface of a hub having a hub flange. The vehicle power unit may have a second-generation structure of an inner-ring rotation type, including an outer ring as a stationary ring and an inner ring fitted to an outer peripheral surface of a hub having a hub flange. In these examples, a combination of the hub and the inner ring corresponds to the "rotary ring" in the claims. The vehicle power unit may have a second-generation structure of an outer-ring rotation type, including an outer ring as a rotary ring having a hub flange and an inner ring as a stationary ring.

The motor generator may also be applied to motors for home electric appliances, for industrial applications, or the like. Besides, the motor generator may also be applied to generators such as wind generators or hydroelectric generators.

Although the present invention has been described in terms of the preferred embodiments thereof with reference to the drawings, various additions, modifications, or deletions may be made without departing from the scope of the invention. Accordingly, such variants are included within the scope of the present invention.

REFERENCE NUMERALS

1 . . . Vehicle power unit
2 . . . Wheel bearing
3 . . . Motor generator (motor, generator)
4 . . . Outer ring (stationary ring)
5 . . . Inner ring (rotary ring)
6 . . . Rolling element
7 . . . Hub flange
8 . . . Knuckle (chassis frame component)
9 . . . Resin material
12 . . . Brake rotor
18 . . . Stator
18a . . . Stator core
18b . . . Stator coil
18ba . . . Coil end
19 . . . Rotor
24 . . . Stator fixing part
25, 25A, 25B . . . Bus bar
Lk . . . Wiring connection part

What is claimed is:
1. A vehicle power unit comprising:
a wheel bearing including a stationary ring and a rotary ring that includes a hub flange and is rotatably supported by the stationary ring through a rolling element, the hub flange being configured to be attached with a wheel and a brake rotor of a vehicle; and
a motor including:
a stator including a stator core having an annular shape and stator coils wound around the stator core, and
a rotor located opposite to the stator in a radial direction of the motor,
wherein a bus bar is connected to the stator coils, and the bus bar is disposed within an axial width of the stator core,
the motor is attached to the wheel bearing, the stator being attached to the stationary ring, and the rotor being attached to the rotary ring,
the motor is disposed radially inward with respect to an inner diameter of the brake rotor, and
the motor is disposed in an axial range between the hub flange and an outboard side surface of a chassis frame component of the vehicle, wherein the stator core is fixed to the stationary ring through a stator fixing part, and the bus bar is disposed axially adjacent to the stator fixing part, and the bus bar is disposed between two stator fixing parts.

2. The vehicle power unit as claimed in claim 1, comprising a resin material having a thermal conductivity equal to or greater than a predefined value, the resin material being disposed in contact with a part of the bus bar and filling a space formed during attachment of the bus bar.

3. A vehicle power unit comprising:

a wheel bearing including a stationary ring and a rotary ring that includes a hub flange and is rotatably supported by the stationary ring through a rolling element, the hub flange being configured to be attached with a wheel and a brake rotor of a vehicle; and a motor including:
   a stator including a stator core having an annular shape and stator coils wound around the stator core, and
   a rotor located opposite to the stator in a radial direction of the motor, wherein a bus bar is connected to the stator coils, and the bus bar is disposed within an axial width of the stator core, the motor is attached to the wheel bearing, the stator being attached to the stationary ring, and the rotor being attached to the rotary ring, the motor is disposed radially inward with respect to an inner diameter of the brake rotor, and the motor is disposed in an axial range between the hub flange and an outboard side surface of a chassis frame component of the vehicle, the stator core is fixed to the stationary ring through a stator fixing part, and the bus bar is divided into a plurality of parts and is disposed in the stator fixing part.

4. A vehicle wheel bearing assembly comprising:

a wheel bearing including a stationary ring and a rotary ring that includes a hub flange and is rotatably supported by the stationary ring through a rolling element, the hub flange being configured to be attached with a wheel and a brake rotor of a vehicle; and a generator including:
   a stator including a stator core having an annular shape and stator coils wound around the stator core; and
   a rotor located opposite to the stator in a radial direction of the generator, wherein a bus bar is connected to the stator coils, and the bus bar is disposed within an axial width of the stator core, the generator is attached to the wheel bearing, the stator being attached to the stationary ring, and the rotor being attached to the rotary ring, wherein the generator is disposed radially inward with respect to an inner diameter of the brake rotor, and the generator is disposed in an axial range between the hub flange and an outboard side surface of a chassis frame component of the vehicle, and the stator core is fixed to the stationary ring through a stator fixing part, and the bus bar is disposed axially adjacent to the stator fixing part, and the bus bar is disposed between two stator fixing parts.

5. A vehicle wheel bearing assembly comprising:

a wheel bearing including a stationary ring and a rotary ring that includes a hub flange and is rotatably supported by the stationary ring through a rolling element, the hub flange being configured to be attached with a wheel and a brake rotor of a vehicle; and a generator including:
   a stator including a stator core having an annular shape and stator coils wound around the stator core; and
   a rotor located opposite to the stator in a radial direction of the generator, wherein
   a bus bar is connected to the stator coils, and
   the bus bar is disposed within an axial width of the stator core, the generator is attached to the wheel bearing, the stator being attached to the stationary ring, and the rotor being attached to the rotary ring, wherein
   the generator is disposed radially inward with respect to an inner diameter of the brake rotor, and
   the generator is disposed in an axial range between the hub flange and an outboard side surface of a chassis frame component of the vehicle, and
   the stator core is fixed to the stationary ring through a stator fixing part, and the bus bar is divided into a plurality of parts and is disposed in the stator fixing part.

* * * * *